United States Patent
Van Rosendale

(10) Patent No.: US 10,208,431 B1
(45) Date of Patent: Feb. 19, 2019

(54) PERMANENT MAGNET MAGLEV USING PASSIVE, LOW-FREQUENCY ELECTROMAGNETIC STABILIZATION

(71) Applicant: John Van Rosendale, Poquoson, VA (US)

(72) Inventor: John Van Rosendale, Poquoson, VA (US)

( * ) Notice: Subject to any disclaimer, the term of this patent is extended or adjusted under 35 U.S.C. 154(b) by 0 days.

(21) Appl. No.: 15/876,280

(22) Filed: Jan. 22, 2018

(51) Int. Cl.
*E01B 25/30* (2006.01)
*B60L 13/04* (2006.01)

(52) U.S. Cl.
CPC .............. *E01B 25/30* (2013.01); *B60L 13/04* (2013.01); *B60L 2200/26* (2013.01)

(58) Field of Classification Search
CPC .......... B60L 13/04; B60L 13/06; B60L 13/10; E01B 25/30; E01B 25/32; B61B 13/08
USPC ................................................ 104/281, 284
See application file for complete search history.

(56) References Cited

U.S. PATENT DOCUMENTS

| | | | |
|---|---|---|---|
| 3,934,183 A | 1/1976 | Saufferer | |
| 8,009,001 B1* | 8/2011 | Cleveland | H02P 6/14 310/156.31 |
| 2005/0204948 A1* | 9/2005 | Post | B60L 13/04 104/281 |
| 2009/0283008 A1* | 11/2009 | Schmid | B60L 13/06 104/284 |

\* cited by examiner

*Primary Examiner* — Mark T Le
(74) *Attorney, Agent, or Firm* — Peter J. Van Bergen

(57) ABSTRACT

A magnetic levitation system includes a guideway and a vehicle. The guideway has ferromagnetic yokes and induction coils. The vehicle has levitation magnets for magnetic interaction with the ferromagnetic yokes wherein the vehicle levitates relative to the guideway. The vehicle has stabilization magnets coupled thereto for electromagnetic interaction with the induction coils as the vehicle travels along the guideway. Each stabilization magnet is a permanent magnet with a two-dimensional pattern of poles alternating in polarity in a first dimension and a second dimension.

22 Claims, 15 Drawing Sheets

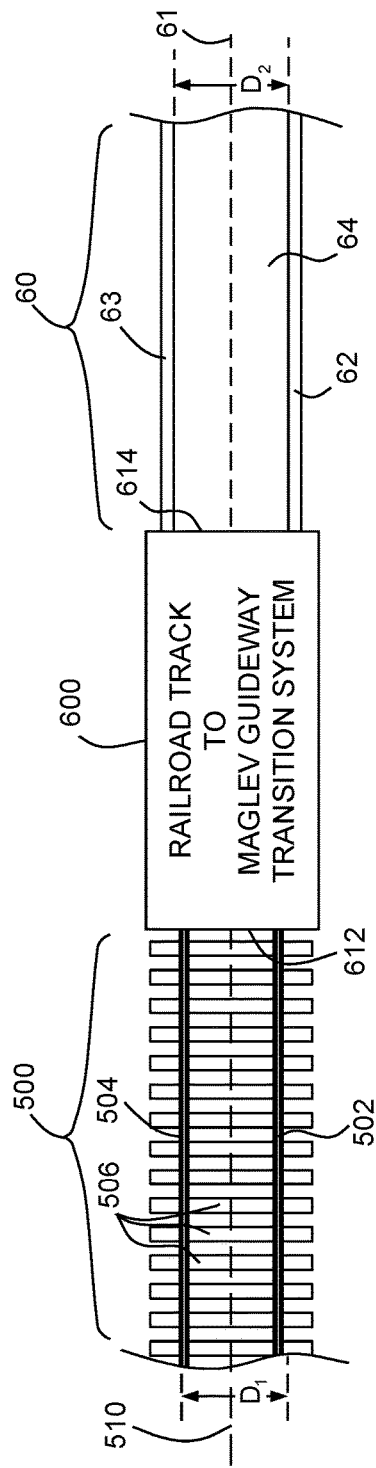
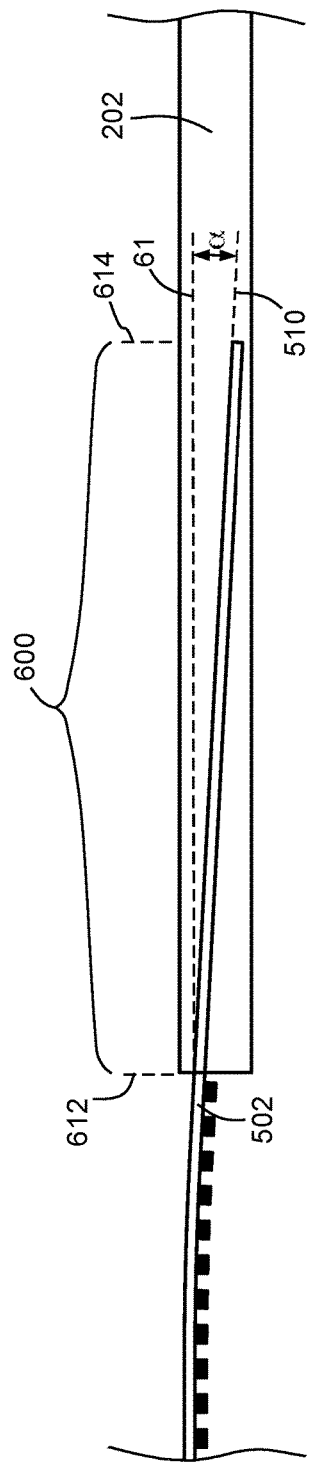
FIG. 14
FIG. 15

PERMANENT MAGNET MAGLEV USING PASSIVE, LOW-FREQUENCY ELECTROMAGNETIC STABILIZATION

FIELD OF THE INVENTION

The invention relates generally to magnetic levitation (or "maglev") systems, and more particularly to a maglev system that uses simple permanent magnet-based levitation coupled with a novel system for stabilization in the horizontal dimension that is configurable to operate at efficient low frequencies.

BACKGROUND OF THE INVENTION

Magnetic levitation (or "maglev" as it is known) is a method of transport that moves vehicles in magnetic suspension along a guideway. Maglev can be faster, quieter, and more efficient than conventional railroad. Moreover, maglev eliminates the wear and vibration from the steel-on-steel contact of conventional railroads, greatly reducing right-of-way maintenance.

There are currently two principal approaches to maglev, electromagnetic suspension (EMS) and electrodynamic suspension (EDS). In EMS, as exemplified by the German Transrapid Maglev, electromagnets on the train attract iron components in the guideway for levitation. The resulting equilibrium is, however, highly unstable so high-speed electronics on the train is used to adjust the current in the electromagnets hundreds of thousands of times per second to achieve stable levitation. In EDS, as exemplified by the Japanese SCMaglev, superconducting magnets on the train induce currents in induction coils in the guideway. Repulsion and attraction of the magnets to these currents then create stable levitation.

Both EMS and EDS systems require energy for levitation and stabilization. In EMS, dissipation in the electromagnets on the train consumes energy. In EDS, dissipation of the eddy currents in the guideway's induction coils consumes energy. In addition, there is substantial cost associated with powering electromagnets and/or building systems with superconducting magnets.

A third alternative, described by Post et al. in U.S. patent publication number 2005/0204948, is a maglev system in which the levitation force is created by attraction of permanent magnets on the vehicle to iron yokes in the guideway. The challenge in this approach is Earnshaw's Theorem, which states that no static configuration of permanent magnets and ferromagnetic materials can provide stable levitation. Thus the levitation created by the permanent magnets described in Post et al. is stable vertically but unstable horizontally. To address this instability, Post et al. describes a stabilization system based on EDS-style electromagnetic attraction and repulsion. Briefly, Post et al. disclose a technology known as "Inductrack III" based on one-dimensional Halbach array magnets. In some embodiments, this stabilization system operates according to the null-flux principle, in others it does not.

The maglev system in Post et al. works well, but in order to create a stabilization system with sufficient horizontal stiffness, the Halbach arrays in the stabilization system must have closely-spaced poles. As a consequence, at typical interurban speeds, the stabilization system operates at an AC frequency of many hundreds of Hertz. Induction coils for such frequencies can be made using woven copper Litz wire and other technologies designed for high-frequencies, but the resulting system is more expensive and less efficient than systems operating at lower frequencies.

SUMMARY OF THE INVENTION

Accordingly, it is an object of the present invention to provide a maglev system.

Another object of the present invention is to provide a maglev system that is cost effective to build and operate.

Other objects and advantages of the present invention will become more obvious hereinafter in the specification and drawings.

In accordance with the present invention, a magnetic levitation system includes a guideway and a vehicle. The guideway has ferromagnetic yokes and induction coils mounted therein. The vehicle has levitation magnets mounted thereon for magnetic interaction with the ferromagnetic yokes wherein the vehicle levitates relative to the guideway for travel along the guideway in a direction of travel. The vehicle has a plurality of stabilization magnets coupled thereto for electromagnetic interaction with the induction coils as the vehicle travels along the guideway. Each of the stabilization magnets is a permanent magnet with a two-dimensional pattern of poles alternating in polarity in a first dimension and a second dimension.

BRIEF DESCRIPTION OF THE DRAWINGS

Other objects, features, and advantages of the present invention will become apparent upon reference to the following description of the preferred embodiments and to the drawings, wherein corresponding reference characters indicate corresponding parts throughout the several views of the drawings and wherein:

FIG. 14 is a schematic view of a bi-directional railroad-track to maglev-guideway transition system for supporting bidirectional travel by a bimodal bogie incorporating the maglev system of the present invention;

FIG. 15 is a side schematic view of an embodiment of the transition system illustrating the non-zero elevation grade between a railroad track and a maglev guideway.

DETAILED DESCRIPTION OF THE INVENTION

Figure 1:
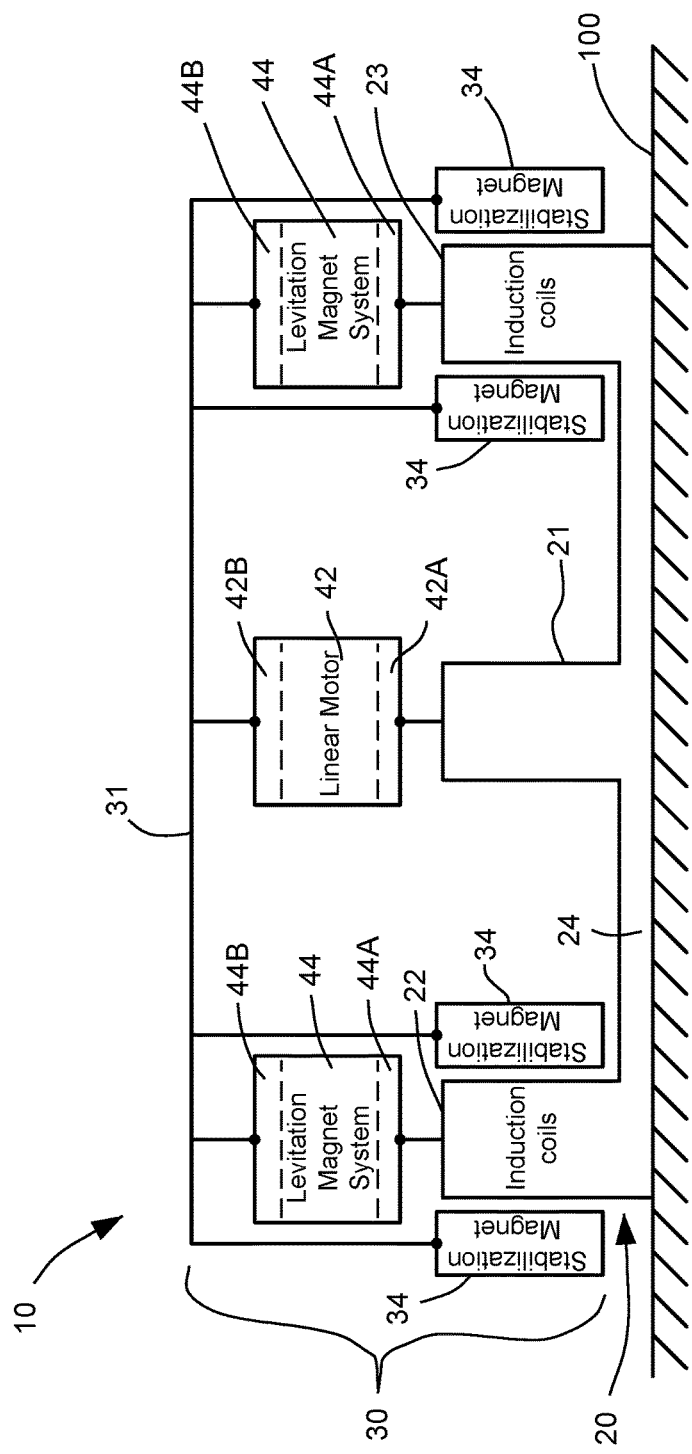
FIG. 1 is a schematic view of a maglev system using permanent magnet levitation in accordance with an embodiment of the present invention.

Referring now to the drawings and more particularly to FIG. 1, a maglev system that uses permanent magnet-based levitation in accordance with an embodiment of the present invention is illustrated. The system, generally referred to by numeral 10, includes two major elements referred to herein as a stationary guideway 20 and a vehicle 30 capable of movement relative to guideway 20. The components associated exclusively with guideway 20 will be indicated using reference numerals in the 20's and the components associated exclusively with vehicle 30 will be indicated using reference numerals in the 30's.

The system shown uses attraction of permanent magnets on vehicle 30 to ferromagnetic materials in guideway 20. As is known in the art, permanent magnet attraction can provide permanent levitation that is stable with respect to vertical disturbances but is unstable horizontally. This is a consequence of Earnshaw's Theorem which states that there can be no statically-stable levitation using only permanent magnets and ferromagnetic materials. In fact, if a maglev system using only permanent magnets and ferromagnetic materials is stable vertically, with vertical stability characterized by positive spring constant k, the system must be unstable horizontally with an equal and opposite spring constant, −k.

Post et al., U.S. patent publication number 2005/0204948, overcome this horizontal instability with a stabilization system based on their "Inductrack" technology. Inductrack is an EDS-style system that uses permanent magnets on a moving vehicle to induce eddy currents in induction coils in the stationary guideway. Magnetic attraction and repulsion of these eddy currents then creates the needed stabilization force.

Figure 2:
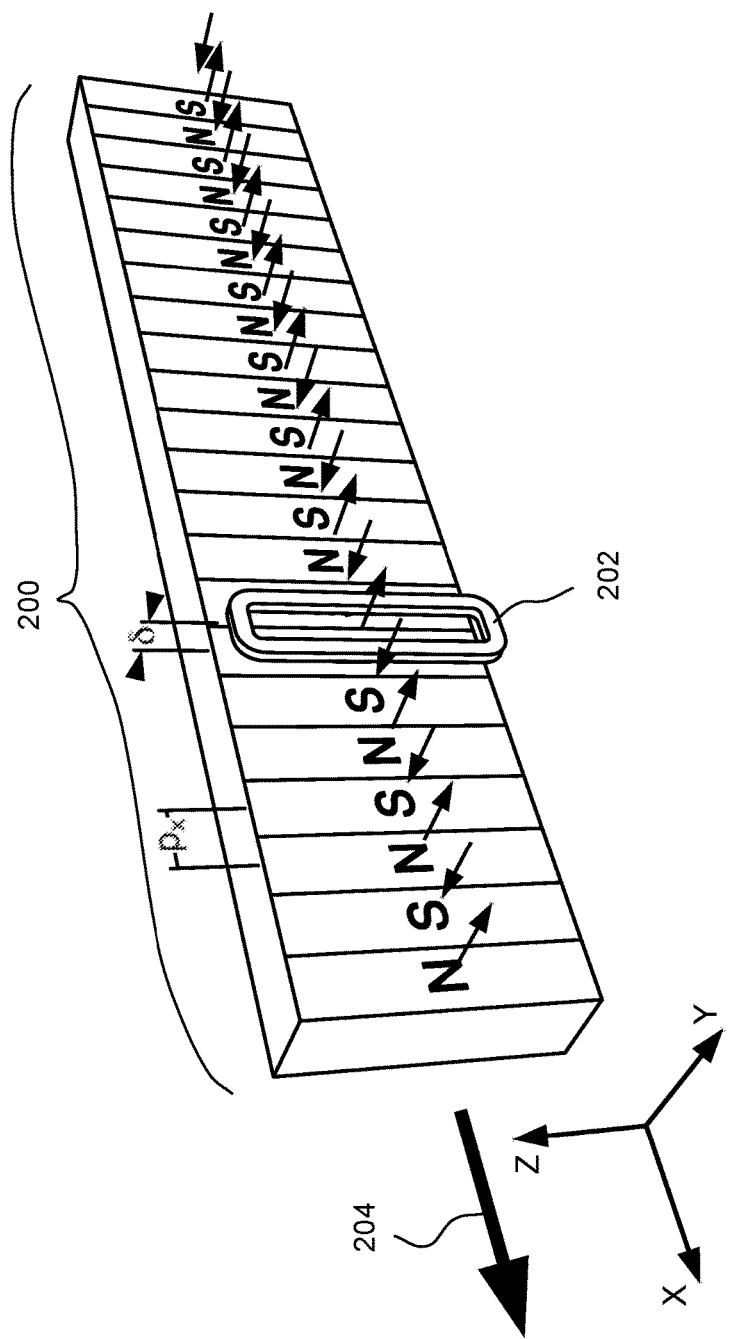
FIG. 2 is an isolated perspective view of a stabilization magnet with a one-dimensional pole pattern in accordance with the prior art, showing magnetic flux passing through one of a guideway's induction coils.

The stabilization magnets in the system described in Post et al. are one-dimensional Halbach arrays. As is known in the art, Halbach arrays are a special magnet configuration that creates a strong field of alternating north and south poles on one face of the magnet and hardly any field on the opposite face. Referring now to FIG. 2, an isolated perspective view of a one-dimensional Halbach array magnet 200 (that would be mounted on a moving vehicle) and a single induction coil 202 (that would be mounted in the stationary guideway) are shown. It is to be understood that a plurality of induction coils 202 would be provided all along the guideway, and that the single induction coil 202 is shown simply for clarity of illustration. The vehicle with Halbach array magnet 200 coupled thereto moves in the x-direction, as indicated by arrow 204, so that the alternating north and south poles of the moving magnet 200 induce an electromotive force (EMF) in induction coil 202.

As shown in FIG. 2, $p_x$ is the spacing between adjacent north and south poles of Halbach array magnet 200. In the coordinate system shown, and neglecting edge effects, the magnetic or B-field then has the form $$B_x = B_0 e^{-ky} \sin(kx)$$

$$B_y = B_0 e^{-ky} \cos(kx)$$

where $k = \pi/p_x$ is the spatial wave number and B represents the magnetic field in the form:

$$B = B_x + B_y$$

As Halbach array magnet 200 moves (along a direction of travel 204 aligned with the x-axis of the illustrated coordinate system) past induction coil 202 mounted in the stationary guideway (not shown), the alternating north and south poles induce an electromagnetic force (EMF). This creates a current in the induction coil and a resulting horizontal force whose y-component is proportional to $B_y^2$. The magnetic field of the stabilization magnet decays exponentially in the y-direction, so this force drops quickly with distance as well. Optimizing stiffness, which is the y-partial derivative of the y-component of the force, one finds the optimal horizontal pole spacing $p_x$ satisfies $$p_x = 2\pi\delta$$

where δ is the horizontal distance between the magnet and induction coil 202.

The difficulty here is that the pole spacing $p_x$ needed to maximize the stabilization system's stiffness is quite small. The horizontal clearance δ is typically on the order of 1.2 centimeters leading to an optimal pole space $p_x$ around 7.5 cm. With spacing this small, a vehicle traveling at an interurban speed of 400 kilometers per hour would drive the induction coils in the guideway at around 740 Hz. Induction coils can be made to operate at such frequencies, but this requires use of expensive copper Litz wire or other techniques for high-frequency operation.

The present invention eliminates the difficulty and expense of constructing induction coils for high-frequency operation through use of a two-dimensional pole pattern on the stabilization magnet. With a two-dimensional pole pattern, the vertical pole spacing $p_z$ can be chosen to maximize stiffness (i.e., $p_z = 2\pi\delta$) while the horizontal pole spacing $p_x$ can be chosen so the induction coils in the guideway operate at a conveniently low frequency, e.g. less than 200 Hz.

Figure 3:
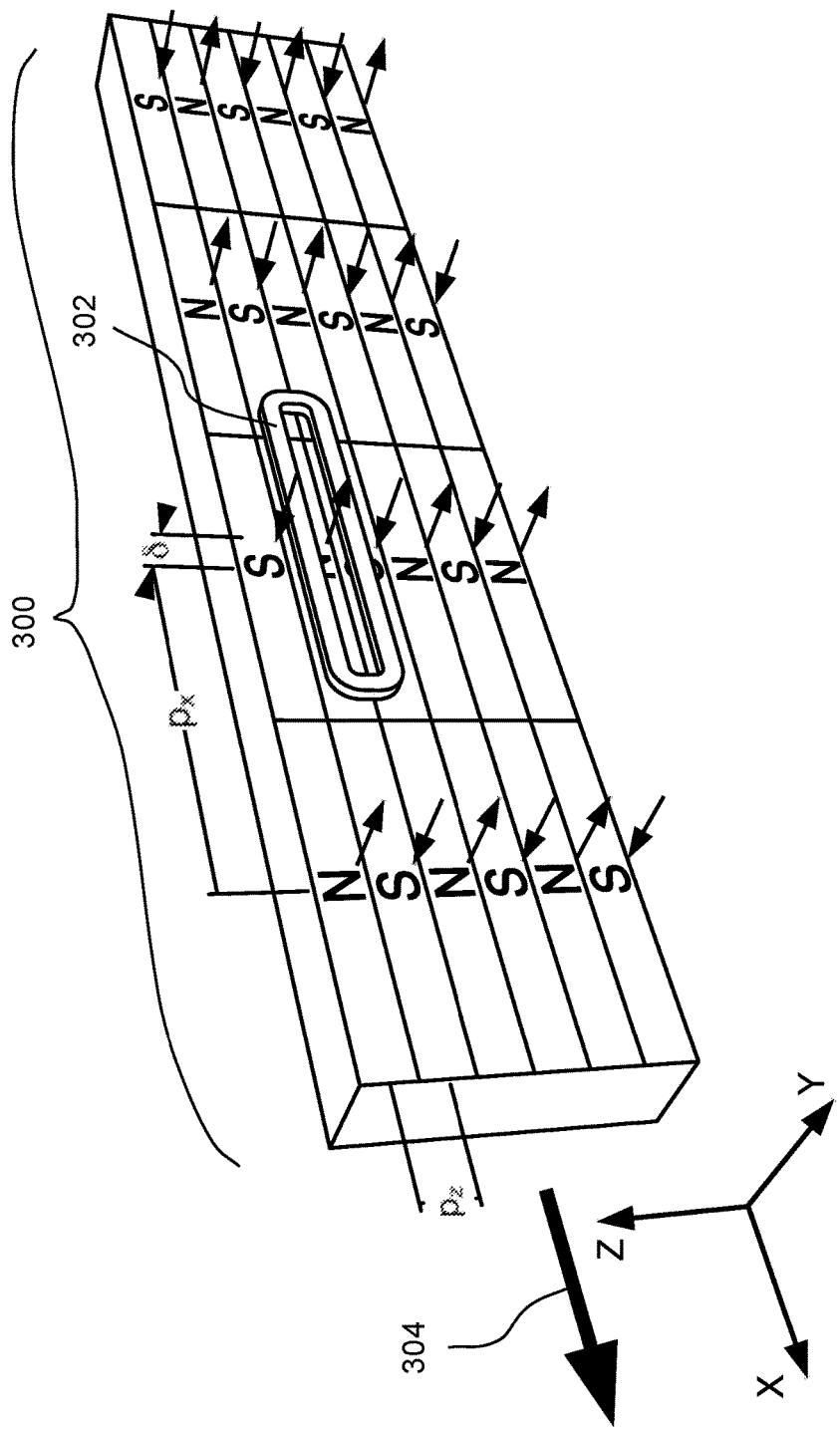
FIG. 3 is an isolated perspective view of a stabilization magnet with a two-dimensional pole pattern electromagnetically engaged with one of the guideway's induction coils in accordance with an embodiment of the present invention.

Referring now to FIG. 3, one possible pole pattern for each of the stabilization magnets 34 (FIG. 1) is realized by a permanent magnet 300 presenting a two-dimensional pattern of poles. In the illustrated embodiment, the pattern of poles is a rectangular array of north ("N") and south ("S") poles that alternate in both dimensions of the array (e.g., the x and z dimensions of the array for the illustrated coordinate system). The first or horizontal dimension of the array of poles is aligned with the direction of travel 304 that magnet 300 will move when it is attached to a vehicle (e.g., vehicle 30). The second or vertical dimension of the array of poles is perpendicular to the first dimension of the array. With $p_z$ chosen to optimize stiffness and the ratio of $p_x$ to $p_z$ in the range of approximately 3 to approximately 14, the system will provide a stiff horizontal stabilizing force while operating below 200 Hz. FIG. 3 shows an induction coil 302 mounted in the adjacent stationary guideway (not shown) a distance δ away from stabilization magnet 300. As before, it is to be understood that induction coils 302 would be provided all along the guideway and that the single induction coil 302 is shown simply for clarity of illustration.

The two-dimensional pole geometry illustrated in FIG. 3 creates a stiff horizontal stabilizing force while allowing operation at low frequency. There is, however, an important issue for consideration. Suppose an induction coil is aligned with the center of a pole on stabilization magnet 300. If the vehicle then shifts up or down by a distance $p_z/2$, the coil would align vertically with a "nodal line" between vertically-adjacent magnet poles and there would be no net flux through the coil. There is always some vertical motion, known as heave, with a maglev vehicle, but the problem here is more fundamental. Suppose the stabilization system is creating a horizontal magnetic force $F_y$ acting between stabilization magnet 300 and induction coil 302. In that case, the close vertical spacing of poles in the magnet creates magnetic detents which can manifest as vertical instability countering the vertical stability of the levitation system.

Figure 4:
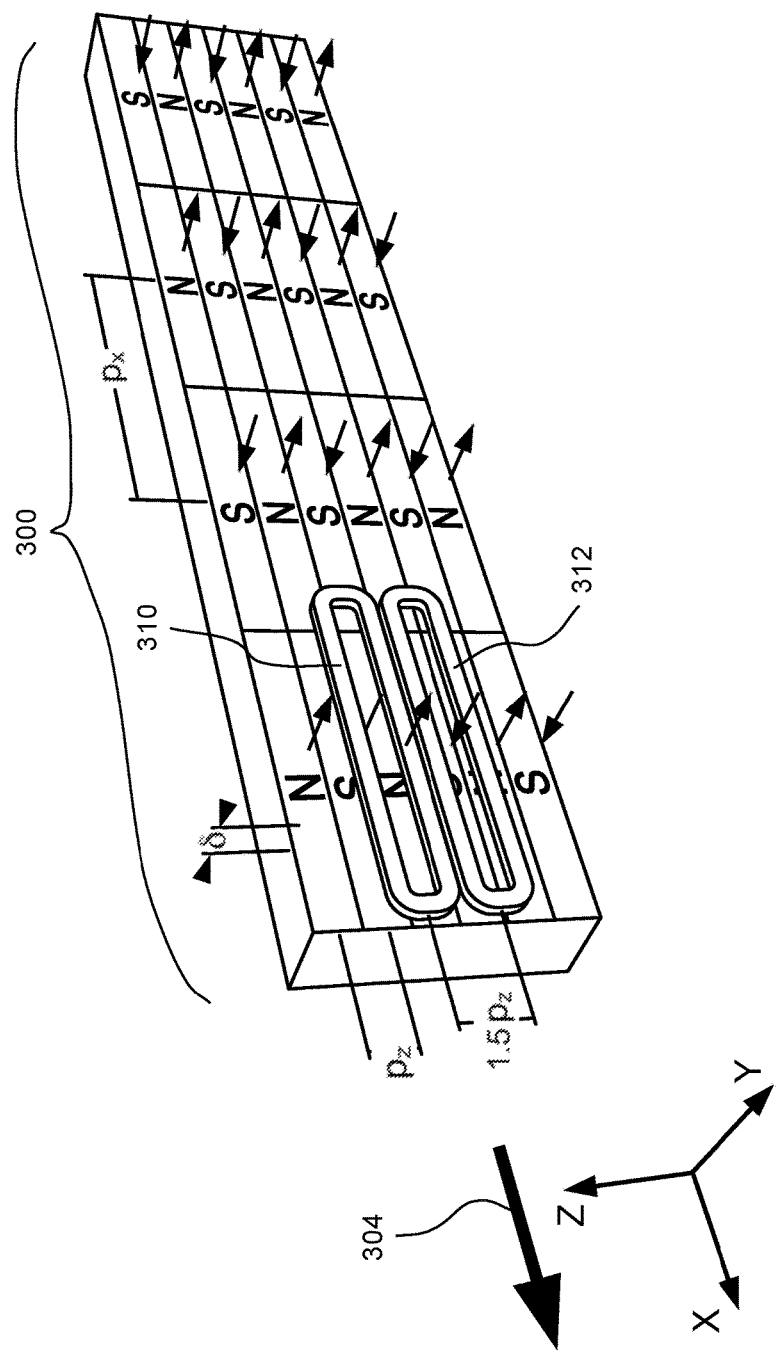
FIG. 4 is an isolated perspective view of a stabilization magnet with a two-dimensional pole pattern electromagnetically engaged with two of the guideway's induction coils whose centers are vertically spaced by a distance of 1.5 $p_z$ where $p_z$ is the vertical spacing between poles, in accordance with an embodiment of the present invention.

A correction for this vertical instability can be effected by using multiple vertically-spaced induction coils, as illustrated in FIG. 4. With two induction coils, 310 and 312, spaced vertically a distance of 1.5 $p_z$ on center, when one coil is centered vertically on a pole of magnet 300, the other will be centered vertically on the horizontal nodal line between poles, and vice versa. In this case these two coils are said to be "in quadrature," and the magnetic flux $B_y$ passing through coils 310 and 312 will always be 270° out-of-phase. In consequence, the total horizontal force will be constant independent of the relative vertical position of magnet 300 and induction coils 310 and 312.

Figure 5:
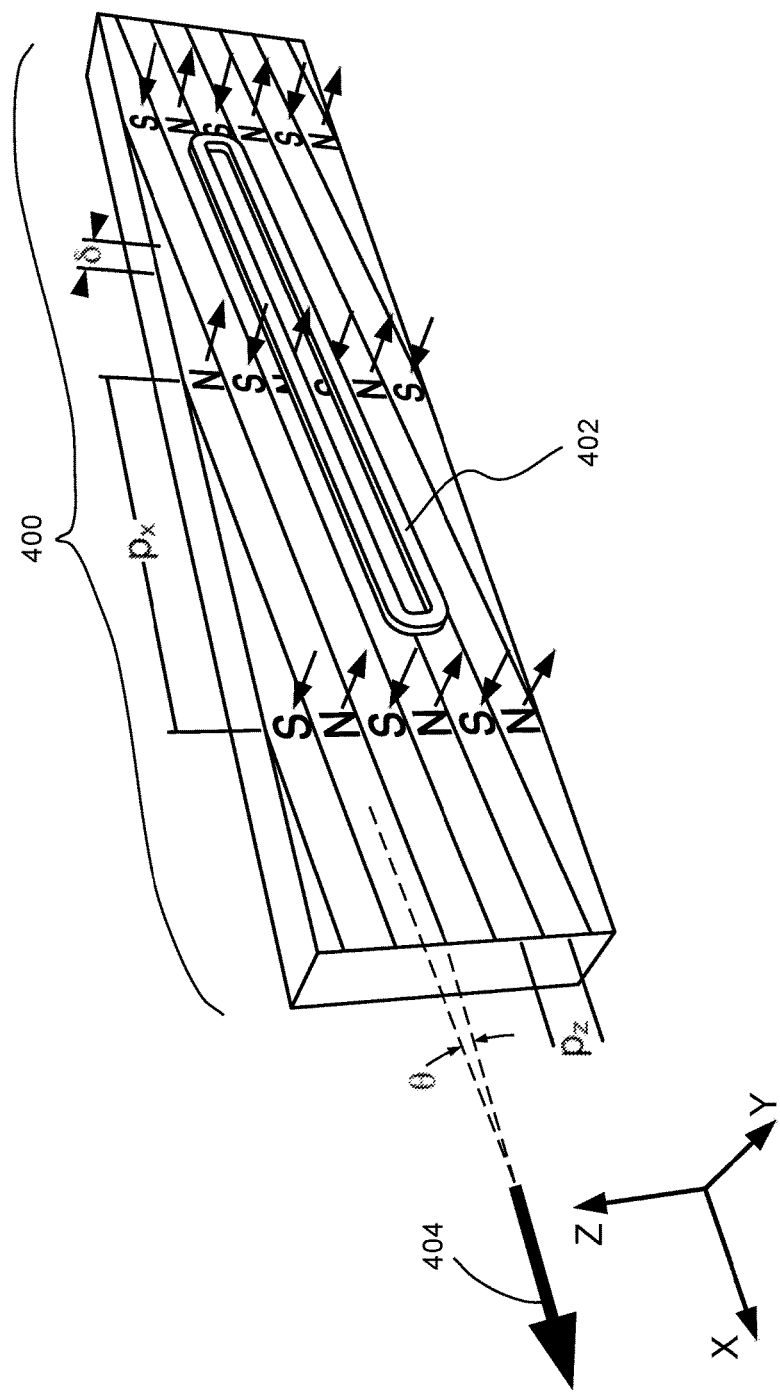
FIG. 5 is an isolated perspective view of a stabilization magnet with pole pattern running diagonally at a shallow angle, $\theta$, relative to the direction of travel with the magnet electromagnetically engaged with one of the guideway's induction coils that are correspondingly angled, in accordance with another embodiment of the present invention.

Referring now to FIG. 5, an alternate approach to the design of an effective stabilization system operating at a low frequency is to use a stabilization magnet 400 whose north ("N") poles and south ("S") poles are canted at a small angle θ in the range of 4-18° with respect to the vehicle's direction of travel 404. As a result, the rectangular two-dimensional pattern of alternating north and south poles is canted at the shallow acute angle θ. The ratio of the effective horizontal pole spacing $p_x$ to vertical spacing $p_z$ will range from 1/tan(18°) to 1/tan(4°) or approximately 3-14. The matching stationary guideway (not shown) will have induction coils mounted therein that are disposed at the same acute angle θ with respect to the direction of vehicle travel 404.

Referring again to FIG. 1, system 10 will be described in greater detail. Simultaneous reference will also be made to FIGS. 6 and 7 where exemplary embodiments are illustrated. As mentioned above, the components associated exclusively with guideway 20 will be indicated using reference numerals in the 20's, and the components associated exclusively with vehicle 30 will be indicated using reference numerals in the 30's. System 10 also includes elements/systems (identified using reference numerals in the 40's) having a portion of their constituent parts included with guideway 20 and a remainder of their constituent parts included with vehicle 30. Guideway 20 is stationary and, in general, is fixed or otherwise coupled to a stationary support 100 (e.g., the ground, an elevated support structure, etc.), the choice and design of which are not limitations of the present invention. Vehicle 30 is assumed to travel along guideway 20.

In the illustrated embodiment, guideway 20 defines three rails 21, 22, and 23 that will extend along the length of guideway 20. In general, all three rails are parallel to one another and in the illustrated embodiment rail 21 is centrally positioned between rails 22 and 23. Rails 21, 22, and 23 can be supported and fixed in their relationship to one another by a rail base 24 that can be coupled thereto or integrated therewith. As will be explained further below, rails 21, 22, and 23 support/house electromagnetic components. Accordingly, the mechanical or structural parts of rails 21, 22, and 23 can be made from non-magnetic and non-electrically-conducting materials that are rigid, robust in a variety of weather conditions, cost-effective, readily-available, and producible. Such materials can include, but are not limited to, concrete, fiberglass, plastics, composites, etc.

Rail 21 supports or incorporates components associated with a portion 42A of a linear motor 42. This could be either the powered/active or unpowered/passive portion of the linear motor. In the previously-mentioned German Transrapid Maglev, the portion 42A of the linear motor in the guideway is active and the remaining portion on the vehicle is passive. Conversely, in the Japanese SCMaglev, the portion 42A of the linear motor in the guideway is passive while the remaining portion on the vehicle is active. Accordingly, it is to be understood that the choice and design of portion 42A are not limitations of the present invention.

Similar to a conventional railroad track, each of rails 22 and 23 is identically shaped/sized in its mechanical profile and is identically constructed in terms of its supported or housed components. Accordingly, only a detailed description of the components supported/housed by rail 22 will be described herein. Supported or housed in the top portion of rail 22 and all along the length thereof is a portion 44A of the levitation magnet system 44. This component is a magnetic yoke 26 consisting of ferromagnetic laminations. As is known in the art, a yoke consisting of magnetically-soft ferromagnetic laminations coated with an insulating varnish can greatly reduce eddy current losses. The number and thickness of laminations in each ferromagnetic yoke are not limitations of the present invention.

Rail 22 also supports/houses induction coils 27. These induction coils are arranged in horizontally-opposed pairs, as exemplified by coils 27A and 27B. In general, each induction coil is identically constructed/configured to define two vertically-oriented and mirror-imaged coils 27A and 27B that are located on opposing sides of rail 22. These induction coils are shown electrically connected by wires 27C, but this electrical connection is optional. As stabilization magnets 34 move past coils 27A and 27B, electromotive force (EMF) is induced in both coils. If there is no electrical connection 27C between these coils, the EMF generated will create a current in each coil separately producing repulsion forces acting against the adjacent stabilization magnets, thus providing the needed stabilization forces. Alternatively, if horizontally-opposed coils, exemplified by coils 27A and 27B, are electrically connected, the system will operate according to the null-flux principle. In this case no current flows in the induction coils except when the vehicle is off center. When the vehicle is off center there will be repulsion forces on one side of rail 22 and attractive forces on the other side, together providing horizontal stabilization. Null-flux systems, as is well known in the art, are more efficient, but the fundamental idea in this patent application, reduction of the frequency of the stabilization system, is valid whether or not the null-flux approach is adopted. Thus, it is to be understood that the above-described novel null-flux approach is not a requirement of the present invention's above-described approach to reducing the frequency of the stabilization system.

Figure 6:
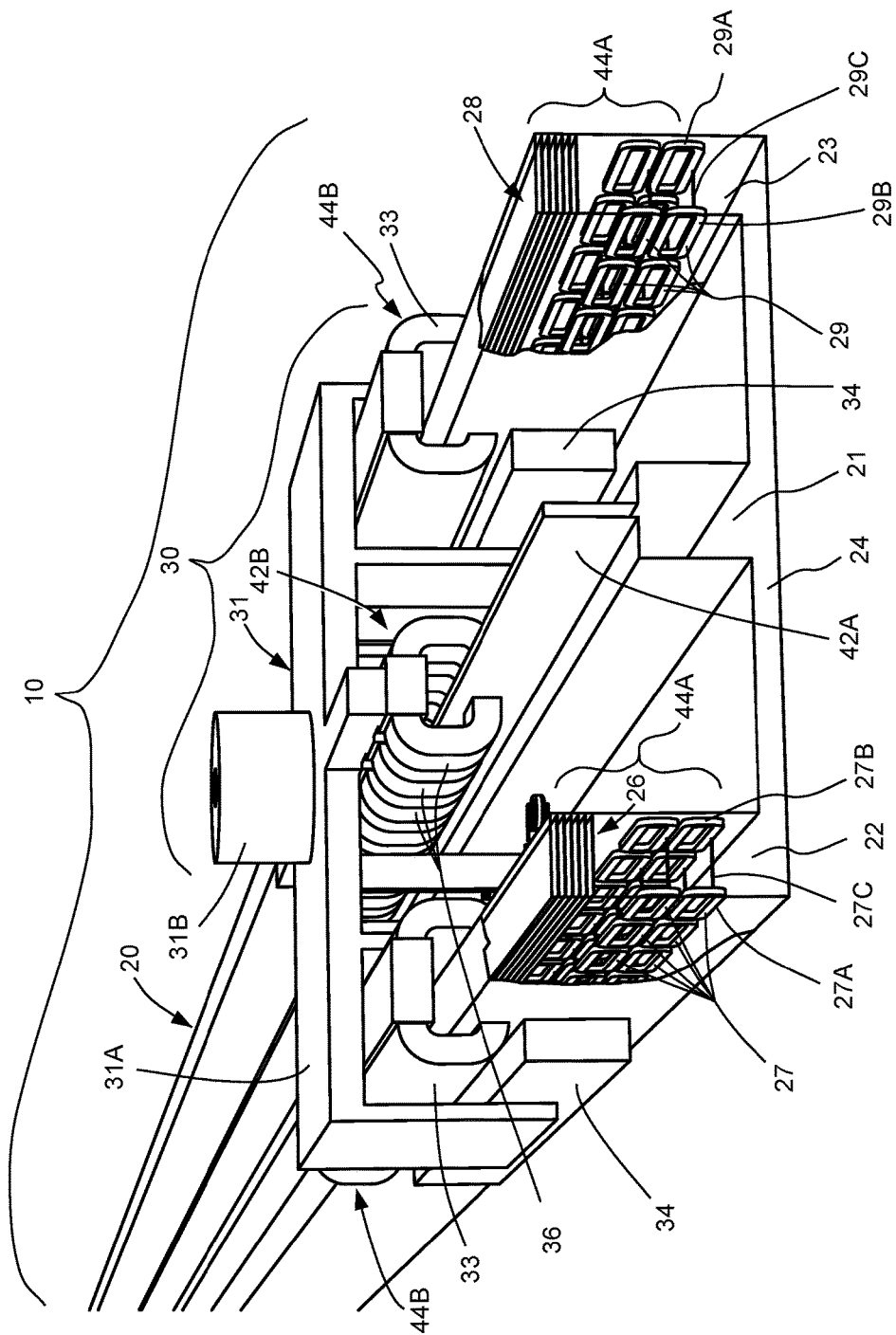
FIG. 6 is a perspective view of a maglev vehicle levitating on a three-rail guideway, with the guideway shown partially cut away to show the internal ferromagnetic yoke and induction coils, in accordance with an embodiment of the present invention.
Figure 7:
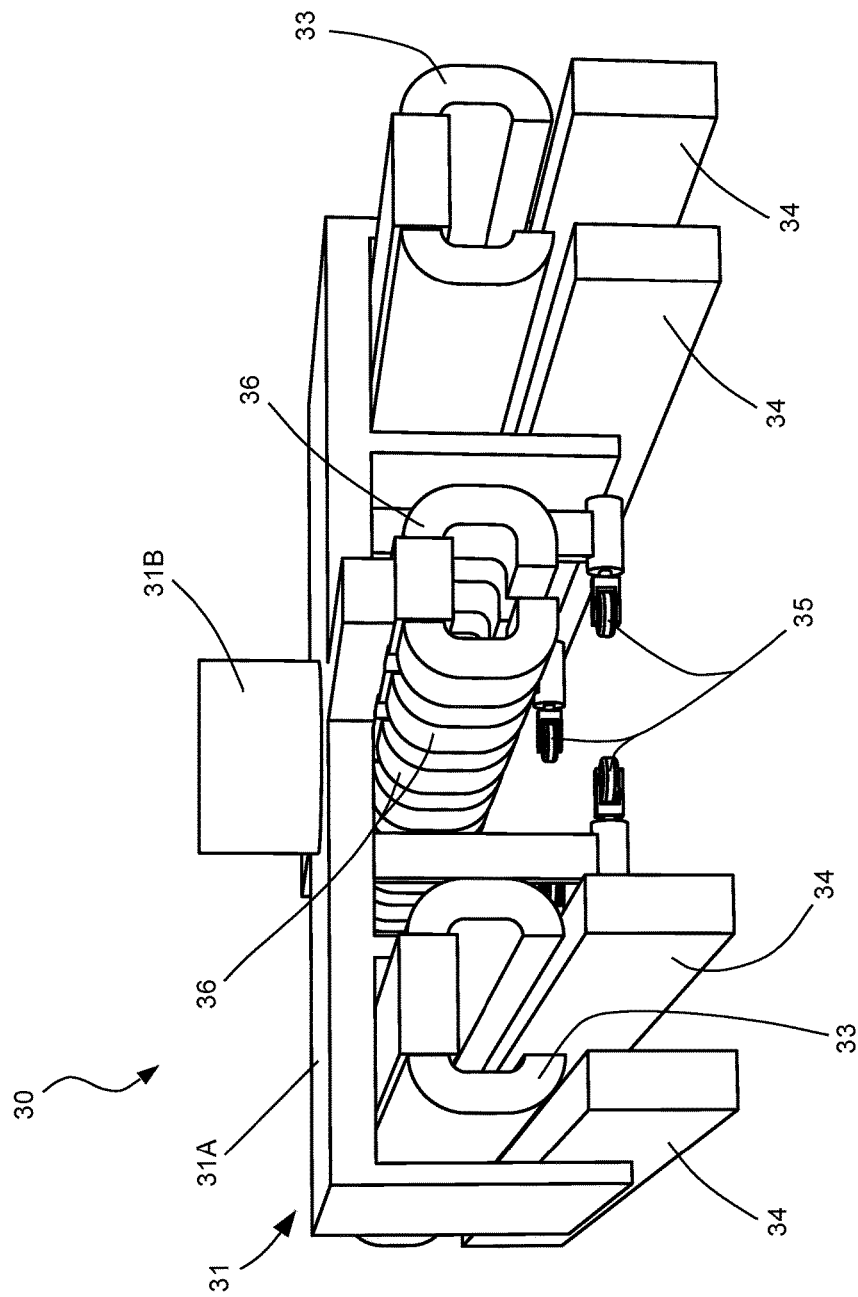
FIG. 7 is a detailed perspective view of the maglev vehicle of FIG. 6, in accordance with an embodiment of the present invention.

Referring to FIG. 6, an embodiment of system 10 shows a vertical arrangement of induction coil pairs 27 and 29, with each such vertical arrangement being spaced-apart from adjacent vertical arrangements all along the length of rail 22 and rail 23, respectively. In the illustrated embodiment, two induction coil pairs 27 (or 29) define a vertical arrangement. However, it is to be understood that the vertical arrangements can be defined by more than two induction coil pairs 27 without departing from the scope of the present invention.

As mentioned above, rail 23 and its supported/housed components are identical to that of rail 22. Accordingly, portion 44A associated with rail 23 can be defined by another ferromagnetic yoke 28 (FIG. 6) supported/housed in the top portion of rail 23, and additional vertical arrangements of induction coil pairs 29 in which vertically-oriented coils 29A/29B are positioned at opposing sides of rail 23. If induction coil pairs 27A/27/B are electrically connected to operate as a null-flux system, coil pairs 29A/29B would electrically connected by wires 29C as well. Ferromagnetic yoke 28 extends along the length of rail 23 as illustrated in FIG. 6. Similar to induction coil pairs 27, the spaced-apart vertical arrangements of induction coil pairs 29 extend along the length of rail 23 (FIG. 6).

Vehicle 30 (FIG. 1) supports/houses a number of components that electromagnetically engage with the components of guideway 20 to support stable levitation of vehicle 30 relative to guideway 20 and propulsion of vehicle 30 along guideway 20. Referring to the details shown in FIG. 7, vehicle 30 includes a support structure 31 typically integrated with or coupled to the vehicle's underbody (not shown) in ways well known in the art. Accordingly, it is to be understood the particular design of support structure 31 is not a limitation of the present invention.

As shown in FIG. 1, support structure 31 supports or incorporates components associated with a remainder 42B of linear motor 42. That is, in general, remainder 42B is the part of linear motor 42 that complements portion 42A supported/housed in rail 21 as explained above. As mentioned above, linear motion propulsion is well understood in the art and will not be discussed further herein.

Support structure 31 also provides support for a remainder 44B of levitation magnet system 44 (e.g., remainder 44B can be realized by C-shaped levitation magnets 33) positioned for magnetic engagement with each portion 44A (e.g., ferromagnetic yokes 26 and 28 associated with rails 22 and 23, respectively, illustrated in FIG. 6). Magnetic engagement between levitation magnets 33 and ferromagnetic yokes 26 and 28 magnetically suspends vehicle 30 over guideway 20.

Support structure 31 supports stabilization magnets 34 on opposing sides of and spaced apart from each of rail 22 and rail 23 to electromagnetically interact with induction coils 27 and 29, respectively, in said rails. Each of stabilization magnets 34 is a permanent magnet with a two-dimensional pattern of poles as previously described herein. Magnets 34 are vertically-oriented on vehicle 30, and will be spaced apart and adjacent to the coils of a vertical arrangement of induction coil pairs when vehicle 30 is magnetically suspended over guideway 20. Typically, all stabilization magnets 34 will be identically configured/constructed.

Referring again to FIG. 6, rail 21 is illustrated supporting a fin that represents/incorporates portion 42A of linear motor 42 as described above (e.g., a powered armature). As more easily seen in FIG. 7, support structure 31 includes a frame 31A that can have a pivot or swivel mount 31B coupled thereto for mounting to the underside of a vehicle body (not shown). Coupled to the central portion of frame 31A are linear motor magnets 36 that define the remainder portion 42B of linear motor 42 (FIG. 1). Coupled to the lateral sides of frame 31A are levitation magnets 33 (defining the reminder 44B of levitation magnet system 44 shown in FIG. 1) and stabilization magnets 34. Since the stabilization system only works above a certain minimum speed, stabilization rollers 35 can be coupled to frame 31A and deployed for engagement with the sides of rail 21 (not shown in FIG. 6) when vehicle 30 is traveling below the minimum speed required for electromagnetic stabilization.

In prior art stabilization systems relying on a stabilization magnets with a one-dimensional pole pattern, operating frequencies of many hundreds of Hertz are unavoidable. Induction coils in the guideway can be designed to work at such frequencies using expensive woven copper Litz wire and other techniques designed for high frequency operation. The present invention overcomes these issues by using stabilization magnets with a two-dimensional pole pattern. The result is an effective stabilization system that can be operated at a lower AC frequency. As a result, the induction coils can be made from low-cost aluminum wire rather than expensive copper Litz wire.

Figure 8:
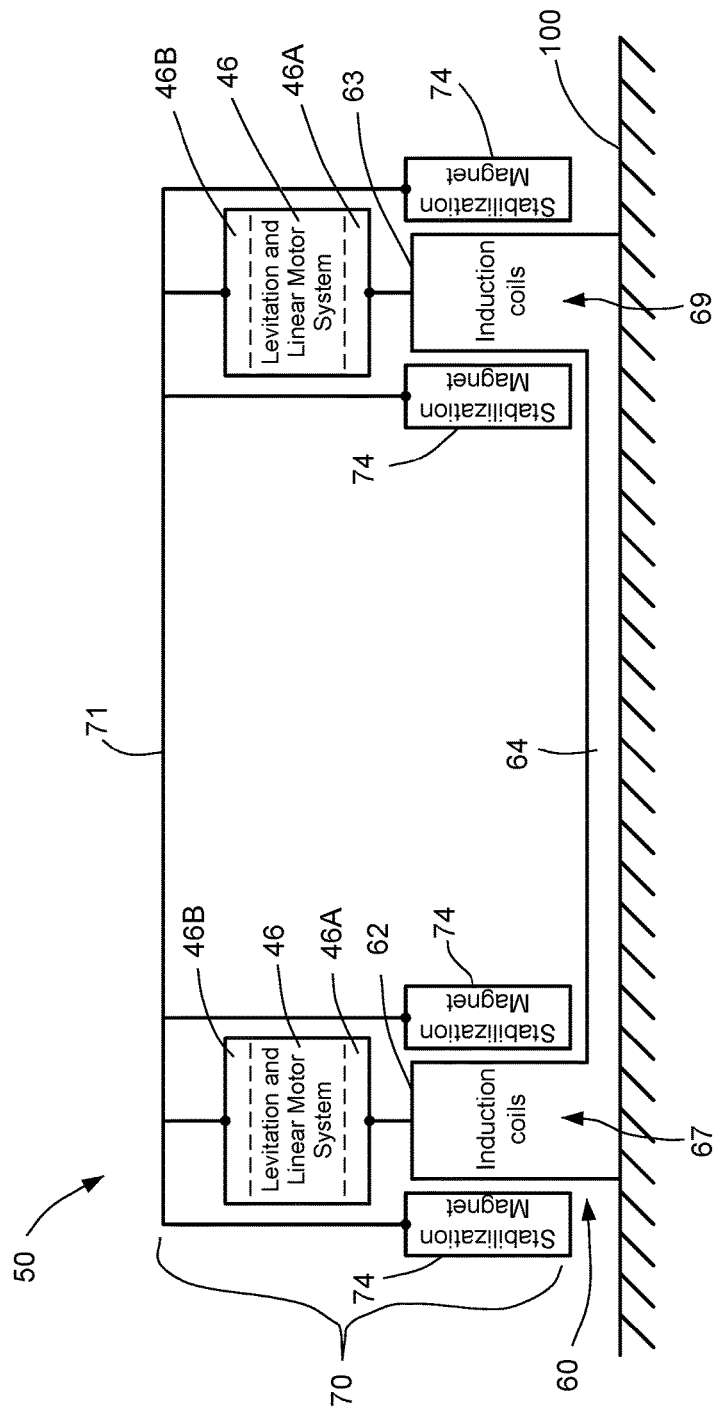
FIG. 8 is a schematic view of a two-rail maglev system, in accordance with another embodiment of the present invention.

The present invention is not limited to the system having a three-rail guideway described above. For example, a two-rail guideway could also incorporate the present invention's low-frequency stabilization system without departing from the scope of the present invention. By way of example, FIG. 8 schematically illustrates a system 50 utilizing a two-rail guideway. In general, system 50 eliminates the central rail (i.e., rail 21 in system 10) by modifying the guideway rails used for levitation and stabilization to also provide the needed linear motor functionality. This could be achieved by adding separate linear motor components to the levitation/stabilization guideway rails, but it can also be achieved by modifying the levitation system so it can provide both levitation and linear motor functionality. By way of an illustrative example, a modification of the levitation system will be explained further herein with simultaneous reference to FIGS. 9 and 10.

Similar to system 10 described above, system 50 includes two major elements referred to herein as a guideway 60 and a vehicle 70. The components associated exclusively with guideway 60 will be indicated using reference numerals in the 60's, and the components associated exclusively with vehicle 70 will be indicated using reference numerals in the 70's. System 50 also includes elements/systems (identified using reference numerals in the 40's) having a portion of their constituent parts included with guideway 60 and a remainder of their constituent parts included with vehicle 70. Guideway 60 is stationary and, in general, is fixed or otherwise coupled to a stationary support 100 (e.g., the ground, an elevated support structure, etc.), the choice and design of which are not limitations of the present invention. Vehicle 70 will be assumed to travel along guideway 60.

Guideway 60 defines two parallel rails 62 and 63 that will extend along the length of guideway 60. Rails 62 and 63 are supported and fixed in their relationship to one another by a rail base 64 that can be coupled thereto or integrated therewith. Similar to the rails in system 10, rails 62 and 63 support/house electrical and/or magnetic components. Accordingly, the mechanical or structural parts of rails 62 and 63 can be made from non-magnetic and non-electrically-conducting materials that are rigid, robust in a variety of weather conditions, cost-effective, readily-available, and producible.

Similar to the above-described rails 22 and 23, each of rails 62 and 63 is identically shaped/sized in its mechanical profile and is identically constructed in terms of its supported or housed components. Each of rails 62 and 63 supports or incorporates components associated with a portion 46A of a levitation and linear motor system 46. For example and with reference to FIG. 9, portion 46A could be realized by spaced-apart or gapped ferromagnetic yokes 66 and 68 arrayed along the length of each rail 62 and 63, respectively, as shown. The spaced-apart yokes function as the armature of a linear motor as well as part of a levitation magnet system as described above with respect to system 10.

There are many kinds of linear motors. The linear motor illustrated here is a switched reluctance synchronous motor. This is a form of synchronous motor using a salient-pole armature made of magnetically-soft material. Use of this type of linear motor for vehicle propulsion is taught in U.S. Pat. No. 3,934,183. The spaced apart ferromagnetic yokes 66/68 in the top of the guideway rails can function perfectly as the armature of a switched reluctance linear motor. Thus these yokes function both as part of the levitation system and as the armature of a linear motor for propulsion and braking.

Figure 9:
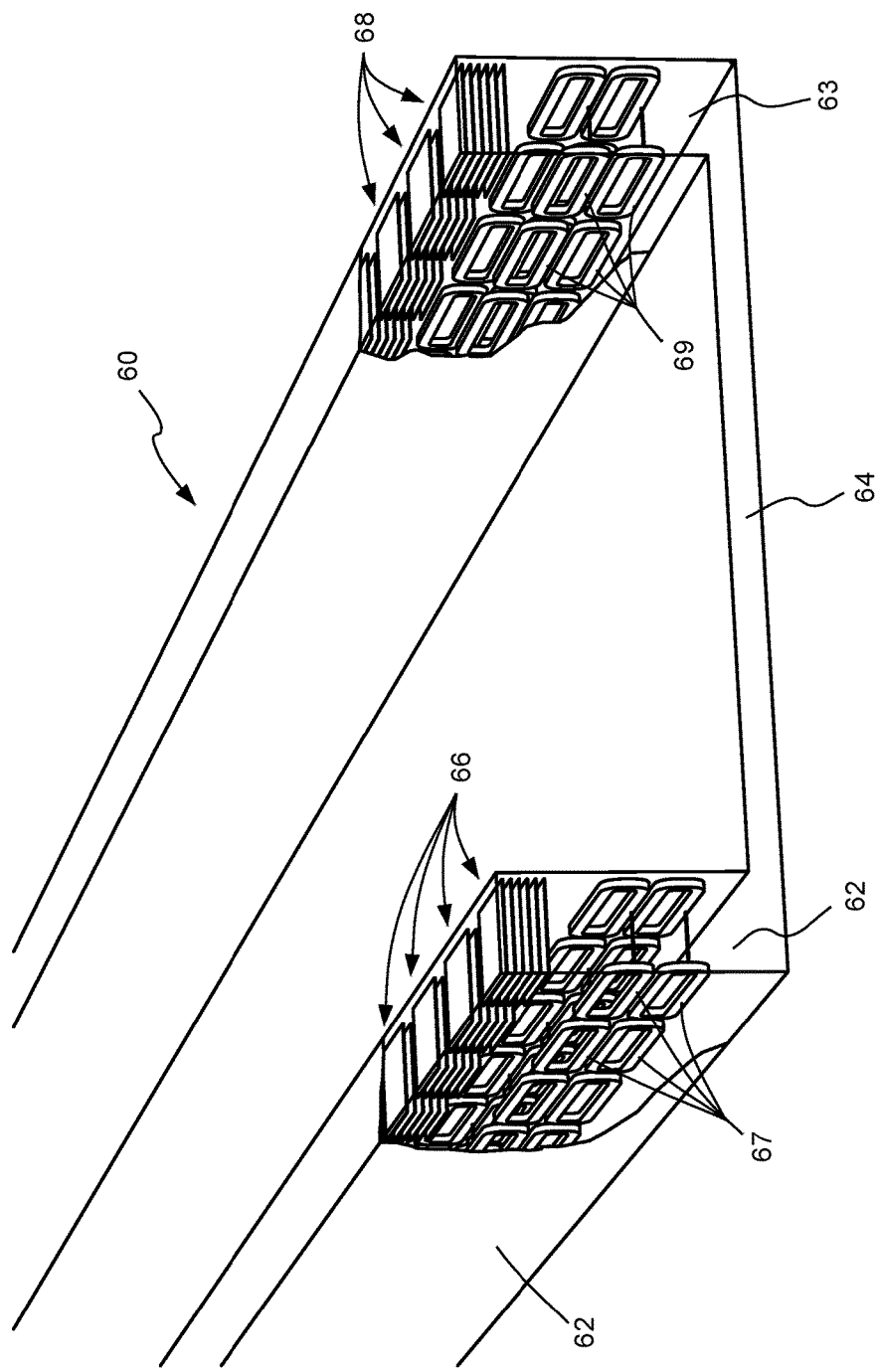
FIG. 9 is a perspective view of a two-rail guideway shown partially cut away to show the internal ferromagnetic yoke and induction coils, in accordance with an embodiment of the present invention.

Rails 62 and 63 also support/house vertical arrangements of induction coil pairs, with each such vertical arrangement being spaced-apart from adjacent vertical arrangements all along the length of the rails as shown in FIG. 9. In the illustrated embodiment, induction coil pairs 67 are provided in rail 62 and induction coil pairs 69 are provided in rail 63. The structure and function of induction coil pairs 67 and 69 are identical to previously-described induction coil pairs 27 and 29, respectively, and will not be described further herein.

Figure 10:
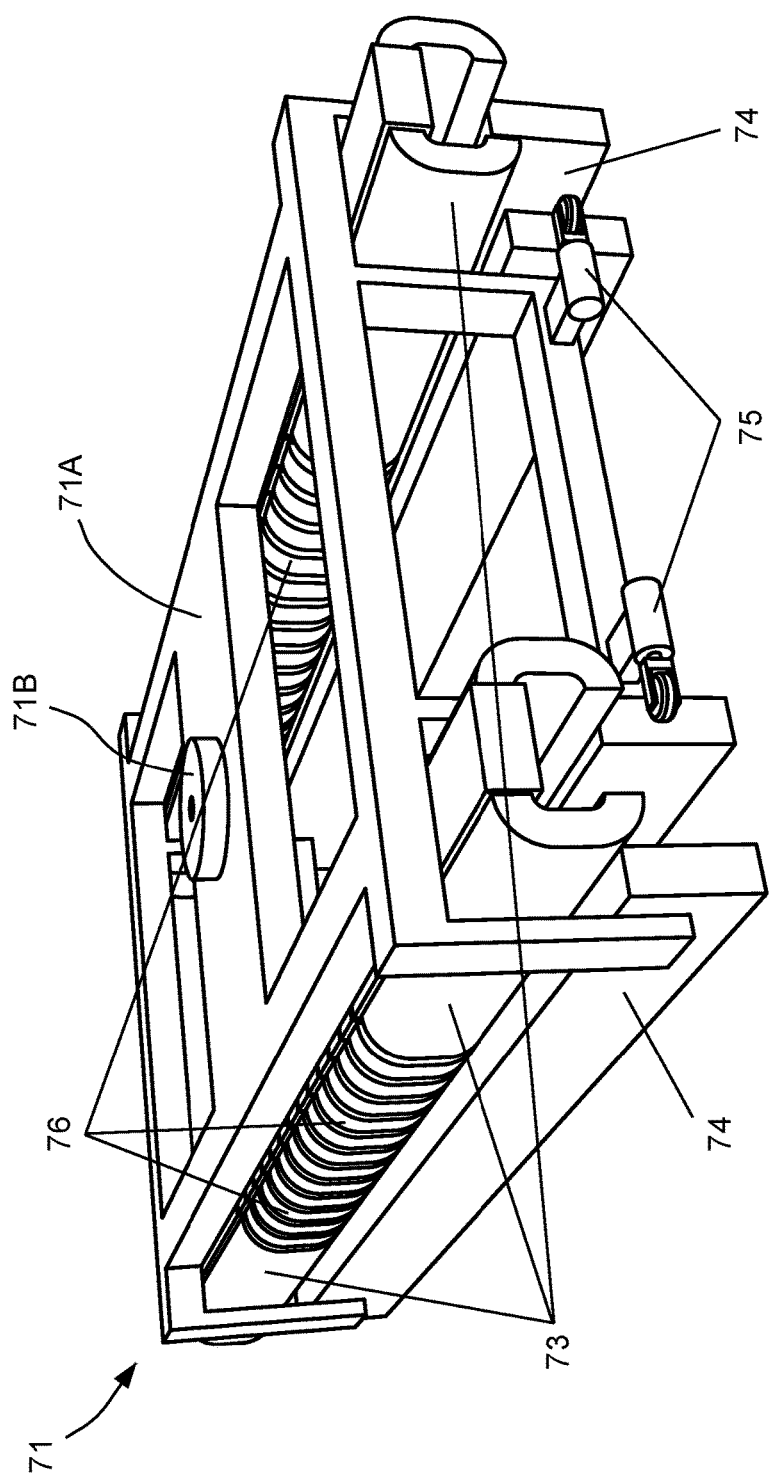
FIG. 10 is an isolated perspective view of a maglev vehicle for use with a two-rail guideway, in accordance with an embodiment of the present invention.

Referring now to FIG. 10, similar to previously-described vehicle 30, vehicle 70 supports/houses components that electromagnetically engage with the components of guideway 60 for levitation of vehicle 70 relative to guideway 60 and propulsion of vehicle 70 along guideway 60. Vehicle 70 includes a support structure 71 that can be constructed/configured in a variety of ways without departing from the scope of the present invention. Support structure 71 will be typically be integrated with or coupled to a vehicle underbody (not shown) in ways well known in the art. Accordingly, it is to be understood that the particular design of support structure 71 is not a limitation of the present invention.

Support structure 71 supports or incorporates components associated with a remainder 46B of levitation and linear motor system 46. That is, in general, remainder 46B includes components that engage with portion 46A (in/on rails 62/63) to provide levitation and propulsion forces. Accordingly, remainder 46B includes elements of a linear motor and a levitation system that complements portion 46A supported/housed in rails 62 and 63 as explained above. Magnetic engagement between portion 46A and remainder 46B results in levitation and propulsion of vehicle 70 along the length of guideway 60.

Support structure 71 can include a frame 71A that can have a pivot or swivel mount 71B coupled thereto for mounting to the underside of a vehicle body (not shown). Coupled to opposing lateral sides of frame 71A in a fixed relationship with respect thereto are a number of spaced-apart linear motor magnets 76 that define the remainder of a linear motor that cooperate with the yokes 66/68 in guideway 60 as described above. Also coupled to the lateral sides of frame 71A and longitudinally aligned with linear motor magnets 76 are levitation magnets 73 that cooperate with yokes 66/68 to provide levitation forces as described above. In the illustrated embodiment, linear motor magnets 76 are disposed between levitation magnets 73. However, it is to be understood that other arrangements for magnets 73 and 76 can be used without departing from the scope of the present invention.

Stabilization magnets 74 are also mounted to opposing lateral sides of frame 71A in a fixed relationship with respect thereto. The structure and function of stabilization magnets 74 in the stabilization scheme of the present invention is identical to previously-described stabilization magnets 34 and will not be described further herein. Since the stabilization generally only works above a certain minimum speed, stabilization rollers 75 can also be coupled to frame 71A and deployed for engagement with the sides of rails 62 and 63 (not shown in FIG. 10) when vehicle 70 is traveling below the minimum speed required for stabilization.

Figure 11:
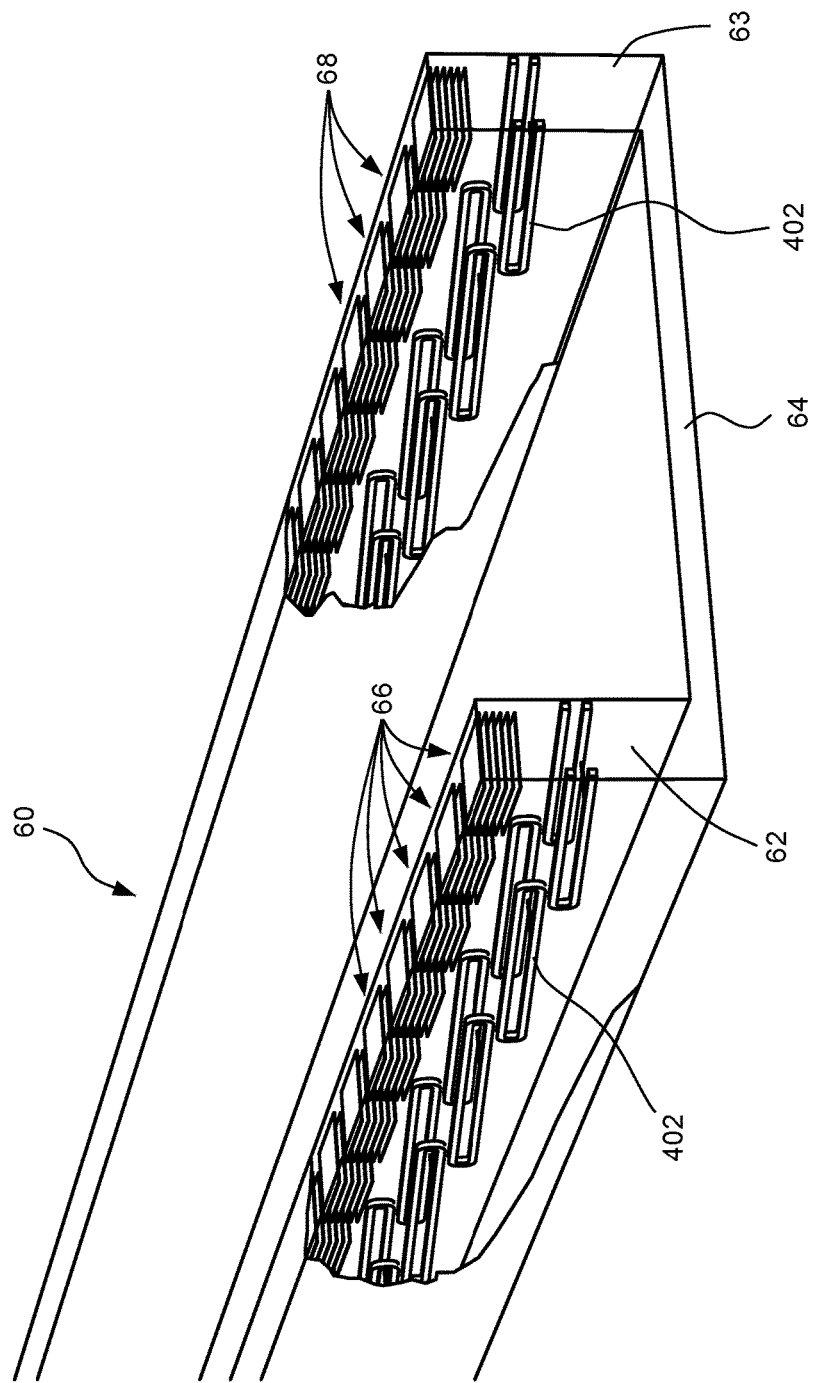
FIG. 11 is a perspective view of a two-rail guideway shown partially cut away to show the internal ferromagnetic yoke and to show induction coils slanted at a shallow angle, as illustrated in FIG. 5, in accordance with another embodiment of the present invention.

The above-described two-rail system can also be adapted to function with the poles on the stabilization magnet 400 disposed at a shallow acute angle as illustrated in FIG. 5. FIG. 11 illustrates a two-rail guideway 60 having the induction coils 402 disposed at an acute angle (with respect to the direction of a vehicle traveling on guideway 60) that corresponds to the acute angle of the magnet poles in the vehicle-mounted stabilization magnet 400, as previously described.

The maglev system described herein achieves near lossless levitation under nominal conditions (e.g., no crosswinds and straight-line travel without the centrifugal force created by curves) without the use of superconducting magnets or use of expensive copper Litz wire in the induction coils in the guideway, resulting in a system that is cost effective to build and operate.

The maglev system described herein is well-suited for interoperability with conventional railroad track. That is, the maglev system of the present invention can be incorporated into a bimodal vehicle that can operate on a conventional railroad track and a maglev guideway. Since the present invention's maglev levitation and stabilization magnets are fixed relative to a support structure (e.g., support structure 71 described above and shown in FIG. 10) that is coupled to a vehicle, the present invention eliminates the need to use magnet movement and positioning systems to accommodate travel on a railroad track or a maglev guideway.

By way of an illustrative example, a two-rail maglev guideway will be used to describe a bimodal bogie configuration based on an embodiment of the maglev system described herein. For clarity of illustration, a single bimodal bogie will be shown and described where a "bogie" is that portion of a railroad car or maglev vehicle that engages a railroad track or maglev guideway, respectively.

Figure 12:
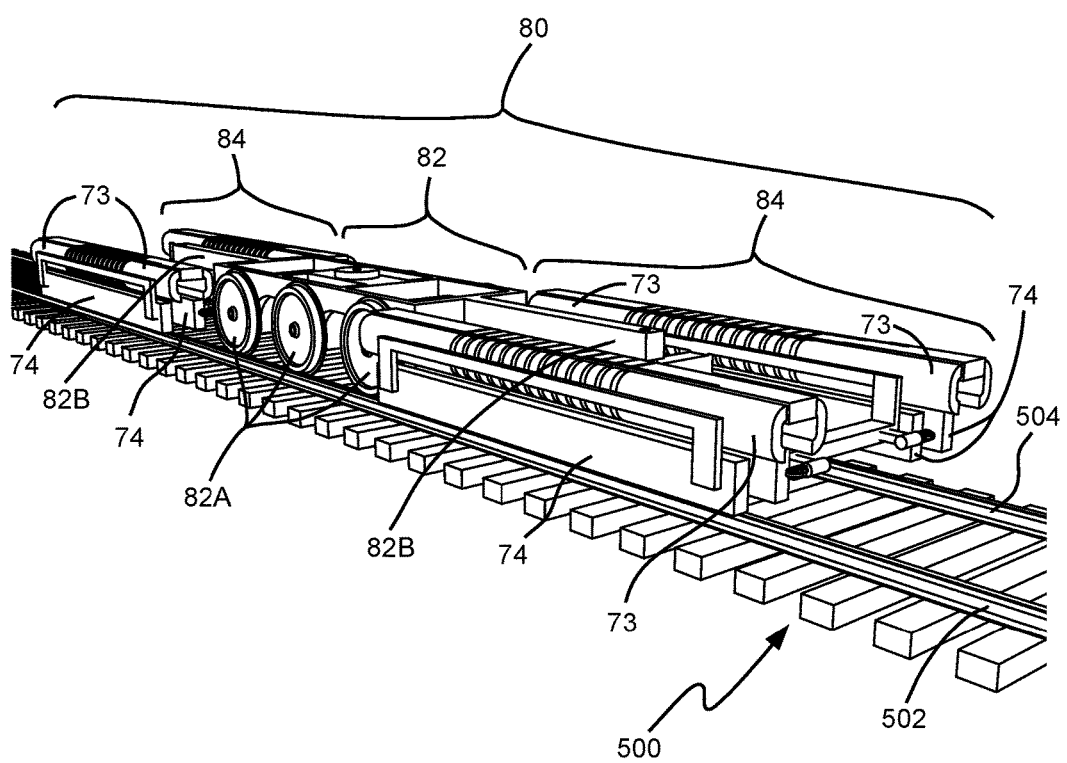
FIG. 12 is a perspective view of a bimodal bogie fully-supported on a conventional railroad track in accordance with an embodiment of the present invention.
Figure 13:
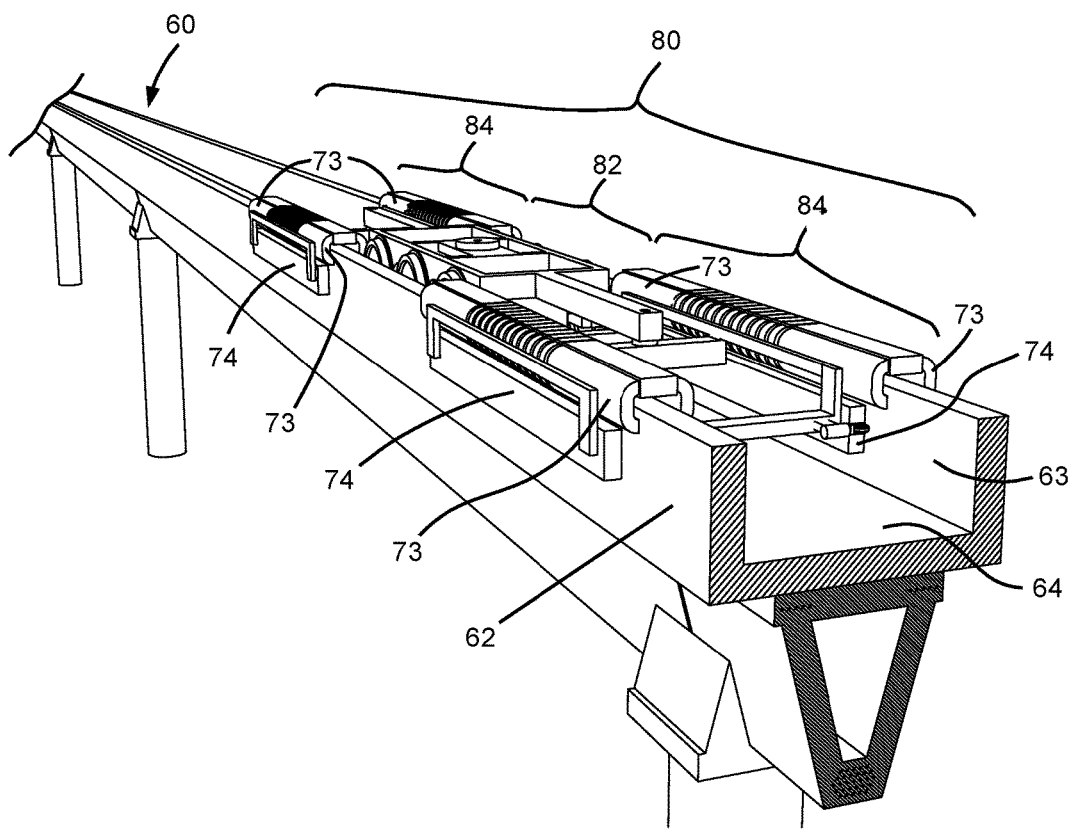
FIG. 13 is a perspective view of the bimodal bogie illustrated in FIG. 12 fully-supported on a two-rail maglev guideway.

By way of an illustrative example, a bimodal bogie for travel along a conventional railroad track 500 and a two-rail maglev guideway 60 is shown in FIGS. 12 and 13, respectively, and is referenced generally by numeral 80. For clarity of illustration, only the rail and guideway engaging components of bimodal bogie 80 are illustrated. One or more of bimodal bogie 80 will support a load (not shown) as would be well understood in the art. Bimodal bogie 80 includes a conventional powered truck 82 whose wheels 82A ride on/along rails 502/504 of conventional railroad track 500 as shown in FIG. 12. Supported by frame extensions 82B of truck 82 at each longitudinal end of powered truck 82 is a maglev truck 84 that includes components (e.g., levitation magnets 73 and stabilization magnets 74) for interactions with components in guideway rails/housings 62/63 as described previously herein. Since powered truck 82 must be suspended in air when bimodal bogie 80 travels along maglev guideway 60, the "sandwiching" of powered truck 82 by maglev trucks 84 provides a balanced support/lifting of powered truck 82 above base 64 when bimodal bogie 80 is traveling along maglev guideway 60 (FIG. 13).

Figure 16:
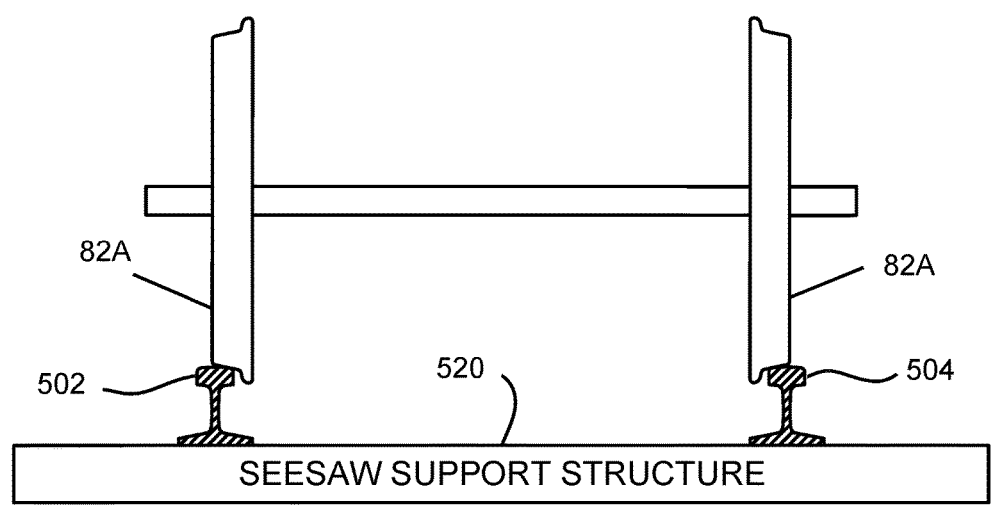
FIG. 16 is a schematic view of a transition region to include a seesaw support structure for equalizing the load due to a bimodal vehicle passing through the transition region.

As described above, a bimodal bogie in accordance with the present invention can be constructed using fixedly-positioned levitation and stabilization magnets. While this obviously provides for simplicity in design, construction, operation, and maintenance, it also allows for a simple transition that supports bidirectional transition between a conventional railroad track and a maglev guideway. To facilitate such bidirectional operation, a railroad-track to maglev-guideway transition system is needed. For example and as illustrated schematically in FIG. 14, a bi-directional railroad-track to maglev-guideway transition system 600 provides an interoperability link between conventional railroad track 500 and, for example, maglev guideway 60. That is, transition system 600 provides the structure for a bimodal vehicle (e.g., a vehicle supported on one or more of bimodal bogie 80 described above) to seamlessly travel bi-directionally between railroad track 500 and maglev guideway 60. An exemplary embodiment of transition system 600 is described in detail in U.S. patent application Ser. No. 15/263,573, the entire contents of which are hereby incorporated by reference, and that will be described briefly below with reference to FIGS. 15 and 16.

Railroad track 500 has two parallel rails 502 and 504 supported on ties 506. The outer edges of rails 502 and 504 are separated by a distance $D_1$. Maglev guideway 60 includes two parallel guideway housings 62 and 63 supported on base 64 as described above. Guideway housings 62 and 63 are separated by a distance $D_2$ that, for purposes of the present invention, is greater than the distance $D_1$ between the outside of railroad track rails 502 and 504.

Transition system 600 includes contiguous extensions from both railroad track 500 and maglev guideway 60. In general, railroad track 500 contiguously enters transition system 600 at one end 612 and terminates at the other end 614 of system 600. Maglev guideway 60 contiguously enters transition system 600 at end 614 and terminates at end 612. Rails 502/504 define an axis of travel 510 for a vehicle traveling there along. Guideway housings 62/63 define an axis of travel 61 for a vehicle traveling there along. Axes of travel 510 and 61 are generally aligned to define a straight-line direction of travel. Between ends 612 and 614 of transition system 600, guideway housing 62 is adjacent and parallel to rail 502, while guideway housing 63 is adjacent and parallel to rail 504. Between ends 612 and 614 of transition system 600, guideway housing 62 is adjacent and parallel to rail 502, while guideway housing 63 is adjacent and parallel to rail 504. Guideway housings 62 and 63 are outside of rails 502 and 504, respectively. A non-zero elevation angle α is defined between axis of travel 61 and axis of travel 510 between ends 612 and 614 of transition system 600.

During the transition from maglev to the conventional rails, a train's wheels in its powered truck must follow the track correctly at the moment when the wheels first contact the track. Similarly, in the transition from rail to maglev, the powered truck's wheels must follow the track correctly as the maglev system lifts the powered truck off the rails. As is well-known in the railroad art, train wheels follow railroad tracks through a process known as "coning." The wheel flanges guide the wheels through turnouts and prevent derailment on sharp curves, but the coning process guides the wheels almost all of the time with the flanges functioning primarily as a backup system. However, coning only works when both left and right wheels in each wheelset make good contact with the rails.

The maglev trucks of the present invention tend to provide lateral stability throughout transition system 600. However, transition would be much smoother and there would be less wear and tear if coning were effective at the point where the conventional railroad wheels in the powered trucks contact or lift off the railroad track rails. To address the above-described issue, the present invention can include a seesaw support structure 520 for the contiguous portion of the railroad track's rails in transition system 600 as described in the above-referenced U.S. patent application Ser. No. 15/263,573. Briefly, seesaw support structure 520 supports rails 502 and 504 in a way that adjusts the height of each rail based upon a differential load applied to the two rails by the truck transitioning to the rails from the maglev guideway. Thus, the transition system provides a seamless interoperability link between a conventional railroad track and a maglev guideway. The transition system can be constructed to fit within a conventional railroad's loading gauge thereby allowing conventional railway vehicles to be adapted for transition to and operation on maglev guideways. The transition system opens the possibility of linking high-speed long-distance maglev transportation with low-speed local railroad track transportation to thereby facilitate high-speed urban-to-urban ground transportation.

Although the invention has been described relative to specific embodiments thereof, there are numerous variations and modifications that will be readily apparent in light of the above teachings to those skilled in the art. It is therefore to be understood that, within the scope of the appended claims, the invention may be practiced other than as specifically described.

What is claimed as new and desired to be secured by Letters Patent of the United States is:

1. A magnetic levitation system, comprising:
   a guideway having ferromagnetic yokes mounted in said guideway and having induction coils mounted in said guideway;
   a vehicle having levitation magnets mounted thereon for magnetic interaction with said ferromagnetic yokes wherein said vehicle levitates relative to said guideway for travel along said guideway in a direction of travel;
   said vehicle having a plurality of stabilization magnets coupled thereto for electromagnetic interaction with said induction coils as said vehicle travels along said guideway; and
   each of said stabilization magnets being a permanent magnet with a two-dimensional pattern of poles alternating in polarity in a first dimension and a second dimension, wherein said two-dimensional pattern of poles have a horizontal spacing between adjacent poles of said permanent magnet measured along said direction of travel and a vertical spacing between adjacent poles of said permanent magnet measured perpendicular to said direction of travel, and wherein said horizontal spacing is in the range of approximately 3 to approximately 14 times greater than said vertical spacing.

2. A magnetic levitation system as in claim 1, wherein said two-dimensional pattern of poles comprises a rectangular array of poles.

3. A magnetic levitation system as in claim 1, wherein said induction coils are arranged in a plurality of vertical arrangements thereof along said guideway, and wherein a center-to-center spacing between vertically adjacent ones of said induction coils in each of said vertical arrangements is 1.5 times said vertical spacing.

4. A magnetic levitation system, comprising:
a guideway having ferromagnetic yokes mounted in said guideway and having induction coils mounted in said guideway;
a vehicle having levitation magnets mounted thereon for magnetic interaction with said ferromagnetic yokes wherein said vehicle levitates relative to said guideway for travel along said guideway in a direction of travel;
said vehicle having a plurality of stabilization magnets coupled thereto for electromagnetic interaction with said induction coils as said vehicle travels along said guideway; and
each of said stabilization magnets being a permanent magnet with a two-dimensional pattern of poles alternating in polarity in a first dimension and a second dimension, wherein said poles are disposed at an acute angle between 4 and 18 degrees with respect to said direction of travel.

5. A magnetic levitation system as in claim 4, wherein said induction coils are disposed at said acute angle.

6. A magnetic levitation system as in claim 1, wherein said guideway comprises three rails, and wherein said ferromagnetic yokes are mounted in two of said three rails and are continuous along said guideway.

7. A magnetic levitation system as in claim 1, wherein said guideway comprises two rails, and wherein said ferromagnetic yokes are mounted in each of said two rails.

8. A magnetic levitation system as in claim 1, wherein said levitation magnets and said stabilization magnets are mounted in a fixed relationship relative to said vehicle.

9. A magnetic levitation system, comprising:
a guideway having ferromagnetic yokes mounted in said guideway and having induction coils mounted in said guideway, said induction coils disposed along said guideway as pairs of said induction coils, each of said pairs defined by two of said induction coils arranged in an opposing spaced-apart relationship and electrically coupled to one another for null-flux stabilization;
a vehicle having levitation magnets mounted thereon for magnetic interaction with said ferromagnetic yokes wherein said vehicle levitates relative to said guideway for travel along said guideway in a direction of travel;
said vehicle having a plurality of stabilization magnets coupled thereto for electromagnetic interaction with said pairs of said induction coils as said vehicle travels along said guideway;
each of said stabilization magnets being a permanent magnet with a two-dimensional pattern of poles alternating in polarity in a first dimension and a second dimension; and
said two-dimensional pattern having a horizontal spacing between adjacent poles of said permanent magnet measured along said direction of travel and a vertical spacing between adjacent poles of said permanent magnet measured perpendicular to said direction of travel;
wherein said horizontal spacing is in the range of approximately 3 to approximately 14 times greater than said vertical spacing, and wherein an operating frequency of said induction coils does not exceed approximately 300 Hz as said vehicle travels along said guideway.

10. A magnetic levitation system as in claim 9, wherein said two-dimensional pattern of poles comprises a rectangular array of poles.

11. A magnetic levitation system as in claim 10, wherein said pairs of said induction coils are arranged in a plurality of vertical arrangements thereof along said guideway, and wherein a center-to-center spacing between vertically adjacent ones of said pairs of said induction coils in each of said vertical arrangements is 1.5 times said vertical spacing.

12. A magnetic levitation system as in claim 9, wherein said poles are disposed at an acute angle between 4 and 18 degrees with respect to said direction of travel.

13. A magnetic levitation system as in claim 12, wherein said induction coils are disposed at said acute angle.

14. A magnetic levitation system as in claim 9, wherein said guideway comprises three rails, and wherein said ferromagnetic yokes are mounted in two of said three rails and are continuous along said guideway.

15. A magnetic levitation system as in claim 9, wherein said guideway comprises two rails, and wherein said ferromagnetic yokes are mounted in each of said two rails.

16. A magnetic levitation system, comprising:
a guideway having ferromagnetic yokes mounted in said guideway and having induction coils mounted in said guideway;
a vehicle having levitation magnets fixedly mounted thereon and in a fixed relationship thereto for magnetic interaction with said ferromagnetic yokes wherein said vehicle levitates relative to said guideway for travel along said guideway in a direction of travel;
said vehicle having a plurality of stabilization magnets fixedly mounted thereon and in a fixed relationship thereto for electromagnetic interaction with said induction coils as said vehicle travels along said guideway; and
each of said stabilization magnets being a permanent magnet with a two-dimensional rectangular pattern of poles alternating in polarity in a first dimension and a second dimension, wherein said poles are disposed at an acute angle between 4 and 18 degrees with respect to said direction of travel.

17. A magnetic levitation system as in claim 16, wherein said two-dimensional pattern of poles have a horizontal spacing between adjacent poles of said permanent magnet measured along said direction of travel and a vertical spacing between adjacent poles of said permanent magnet measured perpendicular to said direction of travel, and wherein said horizontal spacing is in the range of approximately 3 to approximately 14 times greater than said vertical spacing.

18. A magnetic levitation system as in claim 17, wherein said induction coils are arranged in a plurality of vertical arrangements thereof along said guideway, and wherein a center-to-center spacing between vertically adjacent ones of said induction coils in each of said vertical arrangements is 1.5 times said vertical spacing.

19. A magnetic levitation system as in claim 16, wherein said induction coils are disposed at said acute angle.

20. A magnetic levitation system as in claim 16, wherein said guideway comprises three rails, and wherein said ferromagnetic yokes are mounted in two of said three rails and are continuous along said guideway.

21. A magnetic levitation system as in claim 16, wherein said guideway comprises two rails, and wherein said ferromagnetic yokes are mounted in each of said two rails.

22. A magnetic levitation system as, comprising:
- a guideway having ferromagnetic yokes mounted in said guideway and having induction coils mounted in said guideway;
- a vehicle having levitation magnets mounted thereon for magnetic interaction with said ferromagnetic yokes wherein said vehicle levitates relative to said guideway for travel along said guideway in a direction of travel;
- said vehicle having a plurality of stabilization magnets coupled thereto for electromagnetic interaction with said induction coils as said vehicle travels along said guideway;
- each of said stabilization magnets being a permanent magnet with a two-dimensional pattern of poles alternating in polarity in a first dimension and a second dimension; and
- said guideway terminating in a bi-directional railroad-track to maglev-guideway transition system that includes
- a portion of a railroad track having two parallel rails defining a first axis of travel,
- a portion of said guideway defining a second axis of travel, said portion of said guideway being adjacent to said two parallel rails of said portion of said railroad track, wherein a non-zero elevation grade is defined between said first axis of travel and said second axis of travel, and
- a support structure coupled to said portion of said railroad track for seesaw adjustment of a height of each of said two parallel rails based on a differential load applied to said two parallel rails.

* * * * *